US008169370B2

(12) United States Patent
van Rooyen

(10) Patent No.: US 8,169,370 B2
(45) **Date of Patent: *May 1, 2012**

(54) METHOD AND SYSTEM FOR ANTENNA GEOMETRY FOR MULTIPLE ANTENNA HANDSETS

(75) Inventor: Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/428,585

(22) Filed: Apr. 23, 2009

(65) Prior Publication Data

US 2009/0203312 A1 Aug. 13, 2009

Related U.S. Application Data

(63) Continuation of application No. 11/328,657, filed on Jan. 10, 2006, now Pat. No. 7,525,485.

(51) Int. Cl.
*H01Q 1/24* (2006.01)
*H01Q 1/38* (2006.01)
*H04B 7/24* (2006.01)

(52) U.S. Cl. ............... 343/700 MS; 343/702; 455/575.7

(58) Field of Classification Search ........... 343/700 MS, 343/853, 702, 876; 342/361, 362; 455/575.7, 455/39
See application file for complete search history.

(56) References Cited

U.S. PATENT DOCUMENTS 3,921,177 A * 11/1975 Munson ........................ 343/846
4,173,019 A 10/1979 Williams
4,527,163 A 7/1985 Stanton
5,486,836 A 1/1996 Kuffner et al.
5,626,630 A * 5/1997 Markowitz et al. ............. 607/60
5,712,641 A * 1/1998 Casabona et al. ............. 342/362
5,720,770 A * 2/1998 Nappholz et al. ............... 607/30
5,794,145 A 8/1998 Milam
6,088,593 A * 7/2000 Dent .......................... 455/456.1
6,252,549 B1 * 6/2001 Derneryd ............... 343/700 MS (Continued)

FOREIGN PATENT DOCUMENTS

WO WO 2004/080011 9/2004

OTHER PUBLICATIONS

Y. Chung, S. Jeon, D. Ahn, J. Choi, T. Itoh, "High Isolation Dual-Polarized Patch Antenna Using Integrated Defected Ground Structure," IEEE Microwave and Wireless Components Letters, vol. 14, No. 1, Jan. 2004.

(Continued)

*Primary Examiner* — Michael C Wimer

(74) *Attorney, Agent, or Firm* — Sterne, Kessler, Goldstein & Fox PLLC

(57) ABSTRACT

Certain embodiments for antenna geometry for multiple antenna handsets may include receiving RF signals via a patch antenna coupled to a signal processing circuitry within a mobile terminal. The signal processing circuitry may process the RF signals, comprising at least one of a plurality of polarizations that are received by the patch antenna. The patch antenna may be a dual-polarized antenna, and may comprise a plurality of ports. RF signals at a first of the plurality of ports may be orthogonally polarized with respect to RF signals at a second of the plurality of ports. The patch antenna may be optimized to receive multiple RF bands. Each of the multiple RF bands may be communicated via different ports to be processed.

20 Claims, 10 Drawing Sheets

U.S. PATENT DOCUMENTS

| | | | |
|---|---|---|---|
| 6,346,913 | B1 | 2/2002 | Chang et al. |
| 7,103,374 | B2 | 9/2006 | Yia-Jaaski et al. |
| 2006/0128304 | A1 | 6/2006 | Ramaswamy |

OTHER PUBLICATIONS

Y. Fujino, M. Tanaka, M. Fujita, "A New Feeding Method for a Dual-Polarized Patch Antenna with Low Cross-Polarization Ratio," International Symposium on Antennas (JINA), Nov. 2002, Nice, France.

Basics of Dual-Polarized Antennas,' <http://www.iec.org/online/tutorials/dual_polar/>.

Moore, Parejo-Mir, Stephenson, "Circularly Polarized Microstrip Antenna for Cordless Phones," UCR Electrical Engineering, Jun. 6, 2002, 18 pages.

* cited by examiner

METHOD AND SYSTEM FOR ANTENNA GEOMETRY FOR MULTIPLE ANTENNA HANDSETS

CROSS-REFERENCE TO RELATED APPLICATIONS/INCORPORATION BY REFERENCE

This application is a continuation of U.S. application Ser. No. 11/328,657 filed Jan. 10, 2006.

This application makes reference to:

U.S. patent application Ser. No. 11/010,991, filed Dec. 13, 2004;

U.S. patent application Ser. No. 11/010,847, filed Dec. 13, 2004;

U.S. patent application Ser. No. 11/010,461, filed Dec. 13, 2004;

U.S. patent application Ser. No. 11/010,877, filed Dec. 13, 2004;

U.S. patent application Ser. No. 11/010,914, filed Dec. 13, 2004;

U.S. patent application Ser. No. 11/010,486, filed Dec. 13, 2004;

U.S. patent application Ser. No. 11/010,903, filed Dec. 13, 2004;

U.S. patent application Ser. No. 11/011,009, filed Dec. 13, 2004;

U.S. patent application Ser. No. 11/010,855, filed Dec. 13, 2004;

U.S. patent application Ser. No. 11/010,743, filed Dec. 13, 2004;

U.S. patent application Ser. No. 11/010,983, filed Dec. 13, 2004;

U.S. patent application Ser. No. 11/011,000, filed Dec. 13, 2004;

U.S. patent application Ser. No. 11/010,681, filed Dec. 13, 2004;

U.S. patent application Ser. No. 11/010,883, filed Dec. 13, 2004;

U.S. patent application Ser. No. 11/011,006, filed Dec. 13, 2004;

U.S. patent application Ser. No. 11/010,487, filed Dec. 13, 2004;

U.S. patent application Ser. No. 11/010,481, filed Dec. 13, 2004; and

U.S. patent application Ser. No. 11/010,524, filed Dec. 13, 2004.

All of the above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless handsets. More specifically, certain embodiments of the invention relate to a method and system for antenna geometry for multiple antenna handsets.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks, as well as digital television terrestrial broadcasting (DTTB) networks, are being deployed to fulfill subscriber needs. As these services grow in popularity and usage, factors such as cost efficient optimization of network capacity and quality of service (QoS) will become even more essential to the service providers than it is today. These factors may be achieved with careful network planning and operation, improvements in transmission methods, and advances in receiver techniques. A very important consideration will be transmission of signals and reception of the signals at the mobile terminals.

In general, a high signal-to-noise ratio of the received signals at the mobile terminal may reduce an error rate of the received signals. However, transmitted signals are susceptible to fading, especially since the mobile terminal may change physical locations with respect to the transmitting antenna. In this regard, as the mobile terminal moves with respect to the transmitting antenna, the signal strengths of the received signals may vary. This variation may be due to factors such as, for example, multipath fading resulting from reflections and/or "dead zones." It is desirable to mitigate the variation effects at the receiving mobile terminal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a method and system for antenna geometry for multiple antenna handsets, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for antenna geometry for multiple antenna handsets. Aspects of the method may comprise receiving RF signals via a patch antenna coupled to a signal processing circuitry within a mobile terminal. The dimensions of the patch antenna may be chosen so as to optimize the patch antenna for receiving and/or transmitting information bearing signals at certain frequencies. The signal processing circuitry may process the RF signals, which may comprise at least one of a plurality of polarizations. The patch antenna may be a dual-polarized antenna, and may comprise a plurality of ports. RF signals at a first of the plurality of ports may be orthogonally polarized to RF signals at a second of the plurality of ports. The patch antenna may be optimized to simultaneously receive multiple RF bands. This may be accomplished by optimizing one dimension of the patch antenna for one RF band and optimizing another dimension of the patch antenna for another RF band. Each of the multiple RF bands may be communicated via different ports to be processed by, for example, antenna front ends and baseband processors.

Figure 1A:
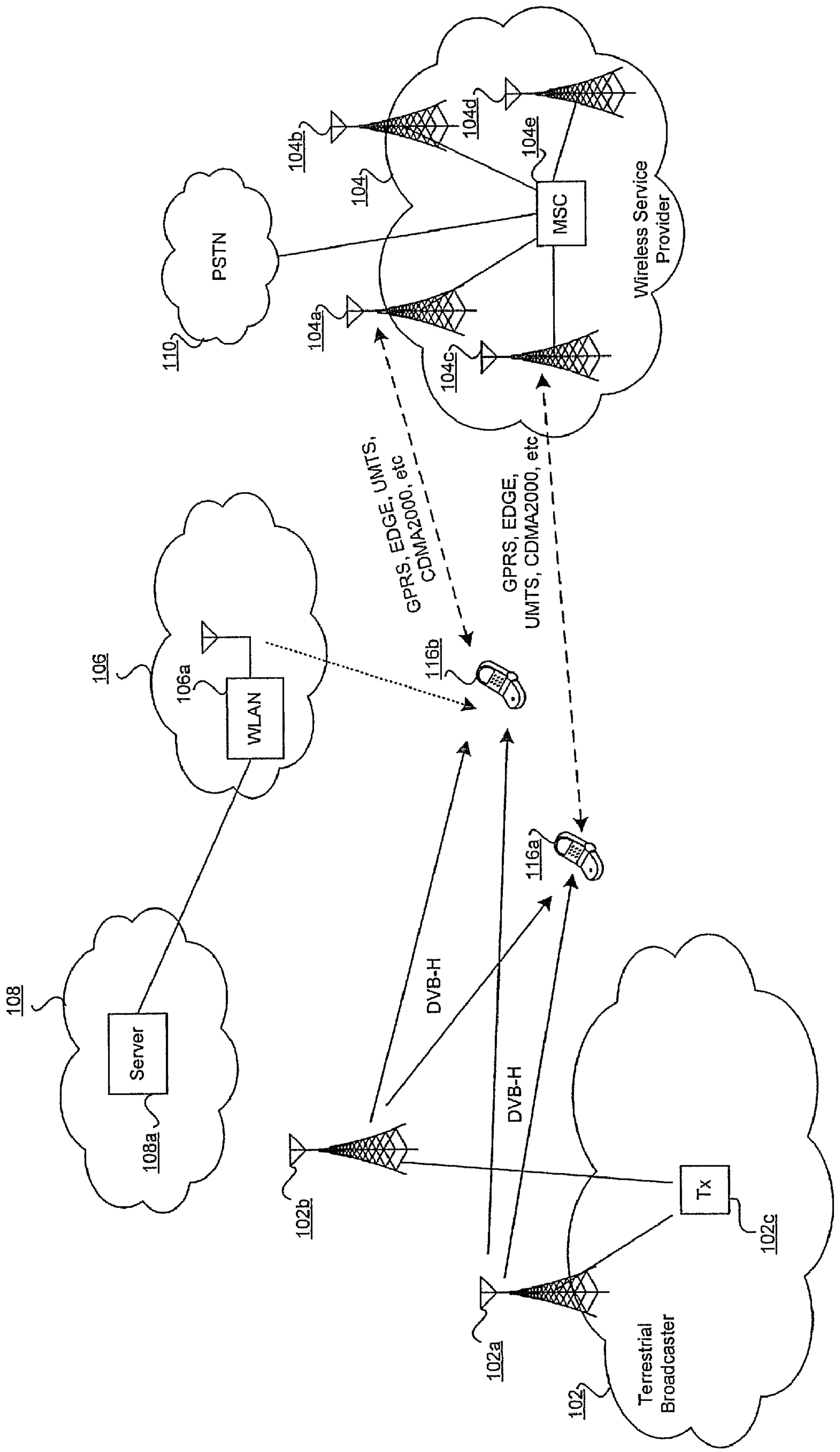
FIG. 1*a* is a block diagram illustrating various exemplary wireless communication services that may be available to mobile terminals, which may be utilized in connection with an embodiment of the invention.

FIG. 1*a* is a block diagram illustrating various exemplary wireless communication services that may be available to mobile terminals, which may be utilized in connection with an embodiment of the invention. Referring to FIG. 1*a*, there is shown terrestrial broadcasting network 102, wireless service provider network 104, a wireless LAN (WLAN) 106, an Internet service provider (ISP) 108, public switched telephone network 110, and mobile terminals (MTs) 116*a* and 116*b*. The terrestrial broadcasting network 102 may comprise VHF/UHF broadcast antennas 102*a* and 102*b*, and a transmitter (Tx) 102*c*. The wireless service provider network 104 may comprise a plurality of cellular base stations 104*a*, 104*b*, 104*c*, and 104*d*, and a mobile switching center (MSC) 104*e*. The WLAN 106 may comprise at least one wireless hub 106*a*. The WLAN 106 may be accessed for Internet browsing and/or voice communication. The ISP 108 may comprise at least one Internet server 108*a* that may communicate with other Internet servers and/or Internet nodes of other ISPs and/or entities that connect to the Internet.

The terrestrial broadcasting network 102 may comprise suitable equipment that may be adapted to encode and/or encrypt data for transmission via the transmitter 102*c*. The transmitter 102*c* in the terrestrial broadcasting network 102 may be adapted to utilize VHF/UHF broadcast channels to communicate information to the mobile terminals 116*a* and 116*b*.

The wireless service provider network 104 may be a cellular or personal communication service (PCS) provider. The term cellular as utilized herein refers to both cellular and PCS frequencies bands. Hence, usage of the term cellular may comprise any band of frequencies that may be utilized for cellular communication and/or any band of frequencies that may be utilized for PCS communication. The wireless service provider network 104 may utilize cellular or PCS access technologies such as GSM, UMTS, CDMA, CDMA2000, WCDMA, AMPS, N-AMPS, and/or TDMA. The cellular network may be utilized to offer bi-directional services via uplink and downlink communication channels. In this regard, other bi-directional communication methodologies comprising uplink and downlink capabilities, whether symmetric or asymmetric, may be utilized.

The WLAN 106 may be, for example, an IEEE 802.11 based wireless network, and the wireless hub 106*a* may be adapted to provide 802.11 based wireless communication. In this case, the mobile terminals 116*a*, 116*b* may be compliant with the 802.11 based wireless network. The WLAN 106 may provide access to the Internet via the ISP 108, for example.

In operation, if the mobile terminal (MT) 116*a* is within an operating range of the VHF/UHF broadcasting antenna 102*a* and moves out of the latter's operating range and into an operating range of the VHF/UHF broadcasting antenna 102*b*, then VHF/UHF broadcasting antenna 102*b* may be adapted to provide UHF/VHF broadcast services to the mobile terminal 116*a*. If the mobile terminal 116*a* subsequently moves back into the operating range of the VHF/UHF broadcasting antenna 102*a*, then the broadcasting antenna 102*a* may be adapted to provide VHF/UHF broadcasting service to the mobile terminal 116*a*. In a similar manner, if the mobile terminal (MT) 116*b* is within an operating range of the VHF/UHF broadcasting antenna 102*b* and moves out of the latter's operating range and into an operating range of the broadcasting antenna 102*a*, then the VHF/UHF broadcasting antenna 102*a* may be adapted to provide VHF/UHF broadcasting service to the mobile terminal 116*b*. If the mobile terminal 116*b* subsequently moves back into the operating range of broadcasting antenna 102*b*, then the VHF/UHF broadcasting antenna 102*b* may be adapted to provide VHF/UHF broadcast services to the mobile terminal 116*b*.

The mobile terminals 116*a* and/or 116*b* may be used to access the wireless service provider network 104 to communicate with other users via voice and/or text messaging. The wireless service provider network 104 may also allow users of the mobile terminals 116*a* and/or 116*b* to access the Internet. The mobile terminals 116*a* and 116*b* may also be used to access the WLAN 106. The WLAN 106 may be used to communicate with others using voice over IP (VOIP) protocol, for example. The mobile terminals 116*a* and 116*b* may also, for example, access the Internet via the WLAN 106. The WLAN 106 may be coupled to the Internet via Internet servers, for example, the server 108*a*.

The public switched telephone network (PSTN) 110 may be coupled to the MSC 104*e*. Accordingly, the MSC 104*e* may be adapted to switch calls originating from within the PSTN 110 to one or more mobile terminals serviced by the wireless service provider 104. Similarly, the MSC 104*e* may be adapted to switch calls originating from mobile terminals serviced by the wireless service provider 104 to one or more telephones serviced by the PSTN 110.

The mobile terminals (MTs) 116*a* and 116*b* may comprise suitable logic, circuitry and/or code that may be adapted to handle the processing of uplink and downlink cellular channels for various access technologies and broadcast UHF/VHF technologies. In an exemplary embodiment of the invention, the mobile terminals 116*a*, 116*b* may be adapted to utilize one or more cellular access technologies such as GSM, GPRS, EDGE, CDMA, WCDMA, and CDMA2000. The mobile terminal may also be adapted to receive and process VHF/UHF broadcast signals in the VHF/UHF bands. For example, a mobile terminal may be adapted to receive and process DVB-H signals. A mobile terminal may also be adapted to request information via a cellular service and in response, receive corresponding information via a VHF/UHF broadcast service. A mobile terminal may be adapted to request information from a service provider via a cellular service and in response, receive corresponding information via a data service, which may be provided via the cellular service. A mobile terminal may also be adapted to request Internet information from an Internet service provider.

Figure 1B:
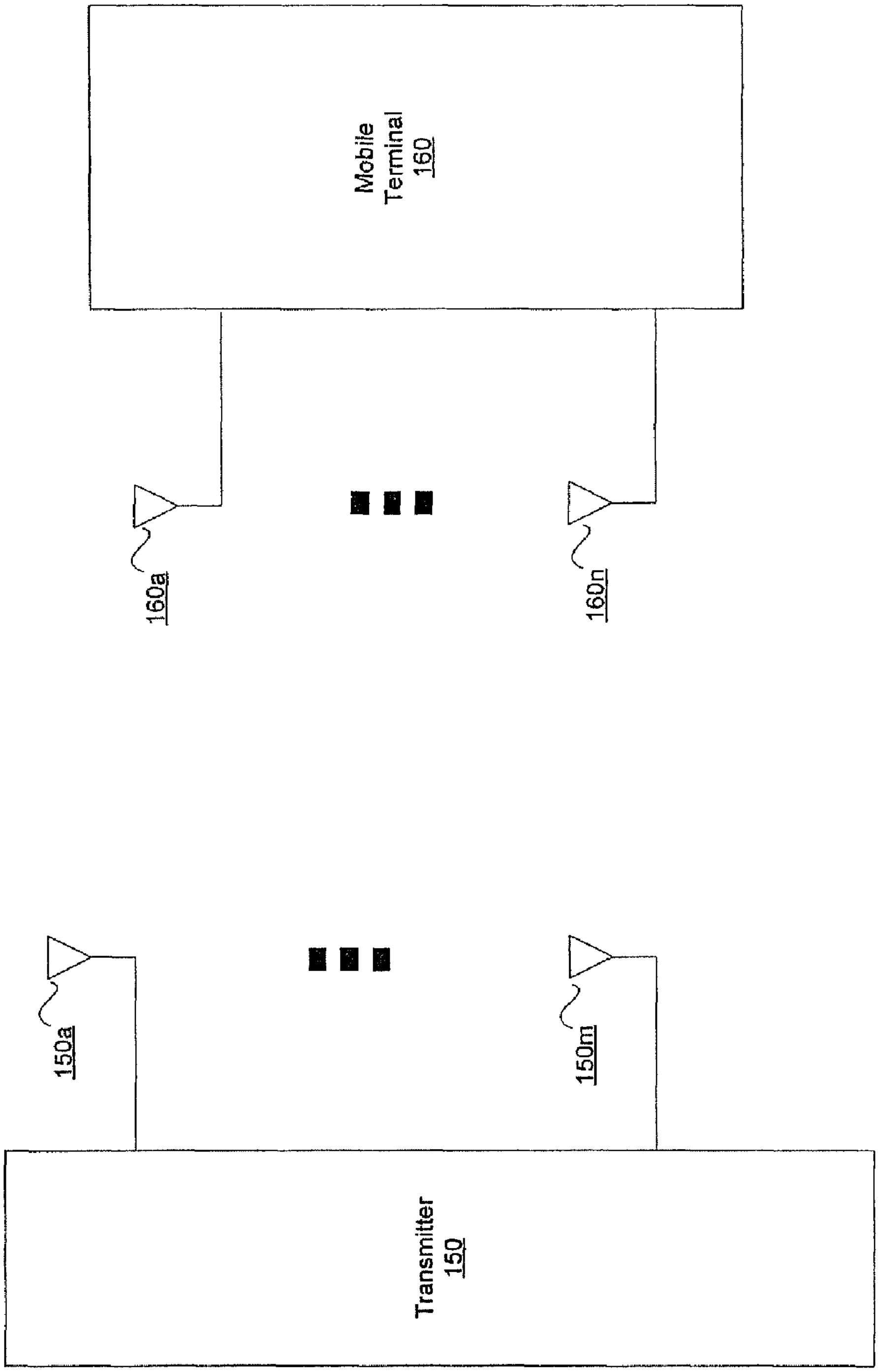
FIG. 1*b* is a block diagram of exemplary transmitter and mobile terminal, which may be utilized in connection with an embodiment of the invention.

FIG. 1*b* is a block diagram of an exemplary transmitter and mobile terminal, which may be utilized in connection with an embodiment of the invention. Referring to FIG. 1*b*, there is shown a base station 150, which may be, for example, the transmit portion of the wireless service provider network 104, and a mobile terminal 160, which may be, for example, the mobile terminals 116*a* and 116*b*. There is also shown corresponding antennas 150*a* . . . 150*m* for the base station 150, and the antennas 160*a* . . . 160*n* for the mobile terminal 160.

In operation, the base station 150 may transmit signals via at least one of the plurality of antennas 150*a* . . . 150*m*. The signals may be received by the mobile terminal 160 via at least one antenna. The mobile terminal 160 may demodulate the received signals from the antennas. Although a plurality of antennas 160*a* . . . 160*n* may be shown for the mobile terminal 160, the mobile terminal 160 may use only one antenna to receive signals. The mobile terminal 160 may be adapted to generate channel estimates from the received signals to feed back to the base station 150 via an uplink channel. The base station 150 may then use the channel estimates to control signals to be transmitted from at least one of the plurality of antennas 150*a* . . . 150*m*. The mobile terminal 160 may transmit signals via the antennas 160*a* . . . 160*n*. The signals transmitted by the base station 150 may be received by at least one of the plurality of the antennas 150*a* . . . 150*m*.

Figure 1C:
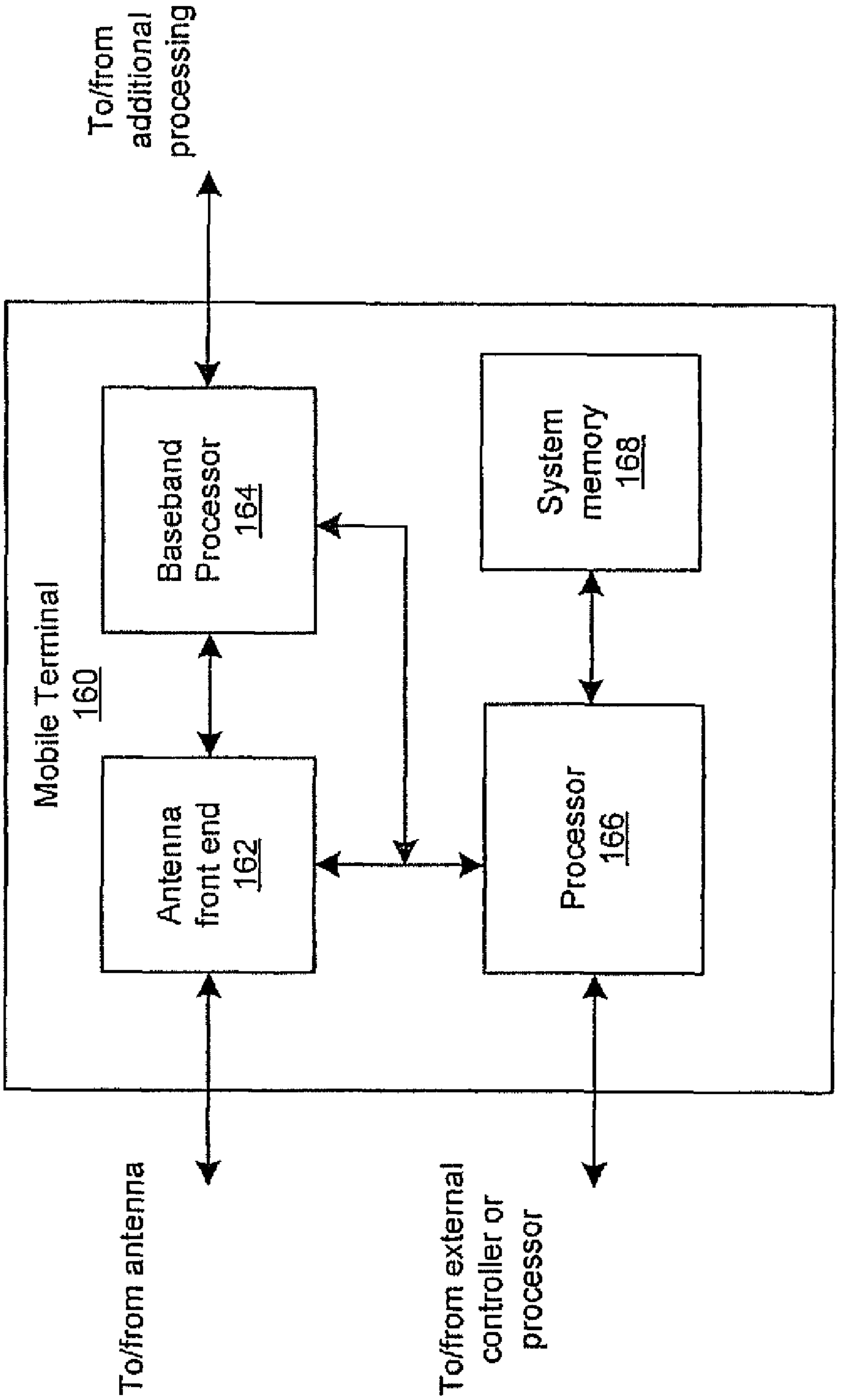
FIG. 1*c* is a block diagram of an exemplary mobile terminal shown in FIG. 1*b*, which may be utilized in connection with an embodiment of the invention.

FIG. 1*c* is a block diagram of an exemplary mobile terminal shown in FIG. 1*b*, which may be utilized in connection with an embodiment of the invention. Referring to FIG. 1*c*, the mobile terminal 160 may comprise an antenna front end 162, a baseband processor 164, a processor 166, and a system memory 168. The antenna front end 162 may comprise suitable logic, circuitry, and/or code that may be adapted to process received RF signals to a baseband signal. The antenna front end 162 may also be adapted to process baseband signals to RF signals for transmission. Accordingly, the antenna front end 162 may comprise separate RF paths for receiving and transmitting. The antenna front end 162 may be coupled to at least one external antenna for signal reception and/or transmission.

Moreover, the antenna front end 162 may comprise other functions, for example, filtering the received RF signal, amplifying the received RF signal, and/or downconverting the received RF signal to an analog baseband signal. The antenna front end 162 may also convert the analog baseband signal to a digital baseband signal. The antenna front end 162 may also perform various functions for transmission. For example, the antenna front end 162 may convert a digital signal from the baseband processor 164 to an analog baseband signal. The antenna front end 162 may upconvert the analog baseband signal to an RF signal, filter the RF signal, and amplify the RF signal, for example.

The baseband processor 164 may comprise suitable logic, circuitry, and/or code that may be adapted to process baseband signals from the antenna front end 162 and/or provide digital baseband signals to the antenna front end 162 for transmission. The processor 166 may comprise suitable logic, circuitry, and/or code that may be adapted to control the operations of the antenna front end 162 and/or the baseband processor 164. For example, the processor 166 may be utilized to update and/or modify programmable parameters and/or values in a plurality of components, devices, and/or processing elements in the antenna front end 162 and/or the baseband processor 164. Control and/or data information may be transferred from at least one controller and/or processor external to the receiver block 160 to the processor 166. Similarly, the processor 166 may transfer control and/or data information to at least one controller and/or processor external to the receiver block 160.

The processor 166 may utilize the received control and/or data information to determine a mode of operation for the antenna front end 162. For example, the processor 166 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 168 via the controller/processor 166. This information stored in system memory 168 may be transferred to the antenna front end 162 from the system memory 168 via the controller/processor 166. The system memory 168 may comprise suitable logic, circuitry, and/or code that may be adapted to store a plurality of control and/or data information, including parameters needed to calculate frequencies and/or gain, and/or the frequency value and/or gain value.

Accordingly, the antenna front end 162 may comprise circuitry that receives RF signals from, for example, at least one of the antennas 160*a* . . . 160*n*, and circuitry that communicates RF signals to at least one of the antennas 160*a* . . . 160*n* for transmission. At least one of the antennas 160*a* . . . 160*n* may receive the RF signals transmitted by the antennas 102*a* . . . 102*m*. The antenna front end 162 may filter the received RF signals, amplify the RF signals, and/or downconvert the RF signals to an analog baseband signal. The antenna front end 162 may also convert the analog baseband signal to a digital baseband signal. The digital baseband signal may be communicated to the baseband processor 164. The baseband processor 164 may process the digital baseband signal to extract information that may have been transmitted. The extracted information may be communicated to the processor 166, which may store the information in the system memory 168.

For transmission, the antenna front end 162 may convert digital signals from the baseband processor 164 to an analog signal and upconvert the analog signal to a higher RF frequency. The RF frequency may be filtered and amplified, and the amplified RF signal may be communicated to at least one of the antennas 160*a* . . . 160*n* for transmission.

Figure 1D:
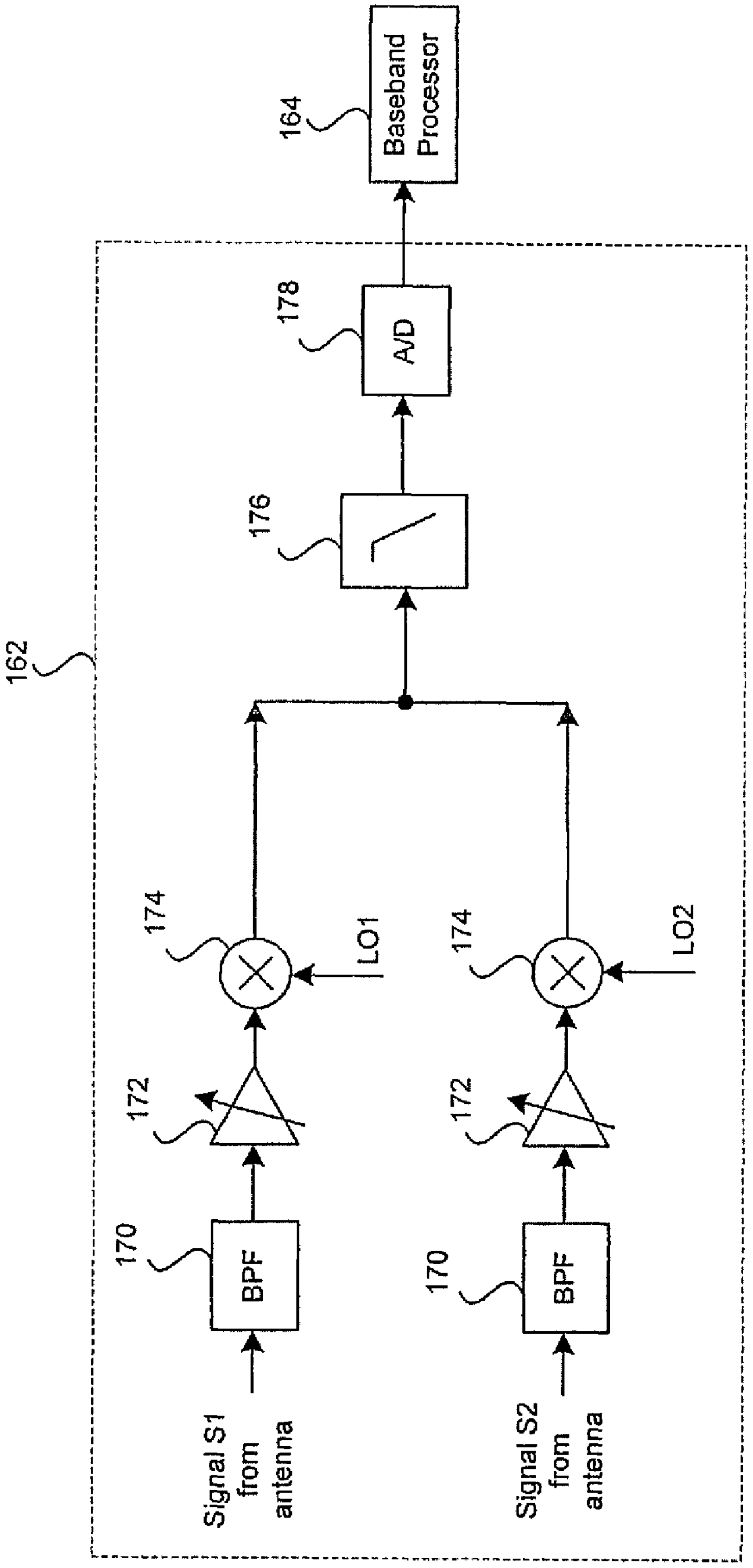
FIG. 1*d* is a block diagram illustrating exemplary receive processing circuitry that combines analog baseband signals, in accordance with an embodiment of the invention.

FIG. 1*d* is a block diagram illustrating exemplary receive processing circuitry that combines analog baseband signals, in accordance with an embodiment of the invention. Referring to FIG. 1*d*, there is shown an antenna front end 162 and a baseband processor 164. The antenna front end 162 may comprise bandpass filters 170, amplifiers 172, mixers 174, a low pass filter 176, and an analog-to-digital converter (A/D) 178.

The antennas 160*a* and 160*n* may receive signals S1 and S2, which may be communicated to inputs of the bandpass filters 170. The bandpass frequency range of the bandpass filters 170 may be dependent on the modulation frequency of the RF signals received. The resulting bandpass filtered signals output from the bandpass filters 170 may be communicated to the amplifiers 172. The amplified signals from the amplifiers 172 may be communicated to the mixers 174. Each of the mixers 174 may mix the amplified signals with one of the local oscillator signals LO1 and LO2. Frequencies of the local oscillator signals LO1 and LO2 may be such that mixing the amplified signal with the local oscillator signal LO1 or LO2 may result in a baseband signal. Accordingly, if the amplified signals have a same RF modulation frequency, the frequencies of the local oscillator signals LO1 and LO2 may be the same frequency.

A RF processing path may comprise the bandpass filter 170, the amplifier 172, and the mixer 174. Accordingly, the signals S1 and S2 may be processed by separate RF processing paths.

The outputs of the mixers 174 may be combined together and the combined signal may be communicated to the low pass filter 176. The low pass filtered signal at the output of the low pass filter 176 may be communicated to the analog-to-digital converter (A/D) 178. The analog-to-digital converter (A/D) 178 may convert the combined signal to a digital signal, and the digital signal may be communicated to the baseband processor 164 for further processing.

The invention need not be limited to the exemplary RF receive path described with respect to FIG. 1*d*. For example, rather than combine the outputs of the mixers 174, the outputs of mixers 174 may be processed and converted to digital signals separately. The separate digital signals may then be communicated to the baseband processor 164 for further processing. This may be desirable, for example, when two different bands of signals such as cellular voice signals and VHF/UHF video broadcast signals are being received and processed. This may be described with respect to FIG. 1*e*. Various embodiments of the invention may also utilize more than two processing legs.

Figure 1E:
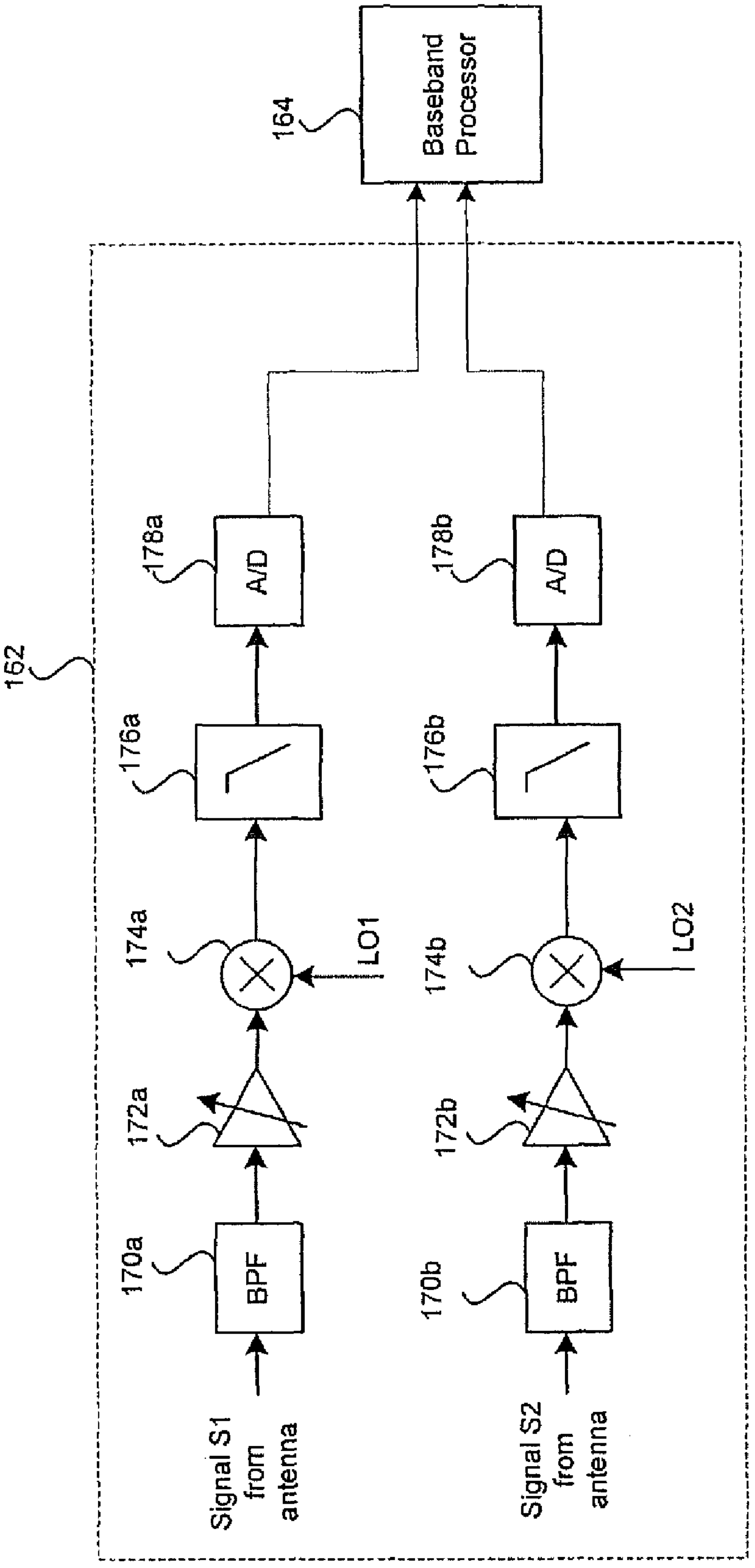
FIG. 1*e* is a block diagram illustrating exemplary receive processing circuitry that keeps processed signals separate, in accordance with an embodiment of the invention.

FIG. 1*e* is a block diagram illustrating exemplary receive processing circuitry that keeps processed signals separate, in accordance with an embodiment of the invention. Referring to FIG. 1*d*, there is shown an antenna front end 162 and a baseband processor 164. The antenna front end 162 may comprise bandpass filters 170*a* and 170*b*, amplifiers 172*a* and 172*b*, mixers 174*a* and 174*b*, low pass filters 176*a* and 176*b*, and analog-to-digital converters (A/D) 178*a* and 178*b*. The bandpass filters 170*a* and 170*b*, the amplifiers 172*a* and 172*b*, the mixers 174*a* and 174*b*, the low-pass filters 176*a* and 176*b*, and analog-to-digital converters (A/D) 178*a* and 178*b* are substantially as described with respect to FIG. 1*d*.

The signals S1 and S2 from the receive antennas, for example, the antennas 160*a* and 160*n*, may be processed by separate RF processing paths. Each step of processing by the separate RF processing paths may be similar to the corresponding step described with respect to FIG. 1*d* except that analog baseband signals at the outputs of the mixers 174 may not be combined together. The analog baseband signals derived from the signal S1 and S2 may be low-pass filtered and converted to digital signals via the low-pass filters 176 and the A/D converters 178. The digital signals from the A/D converters 178 may be communicated to the baseband processor 164. The baseband processor 164 may process the digital signals separately.

Figure 1F:
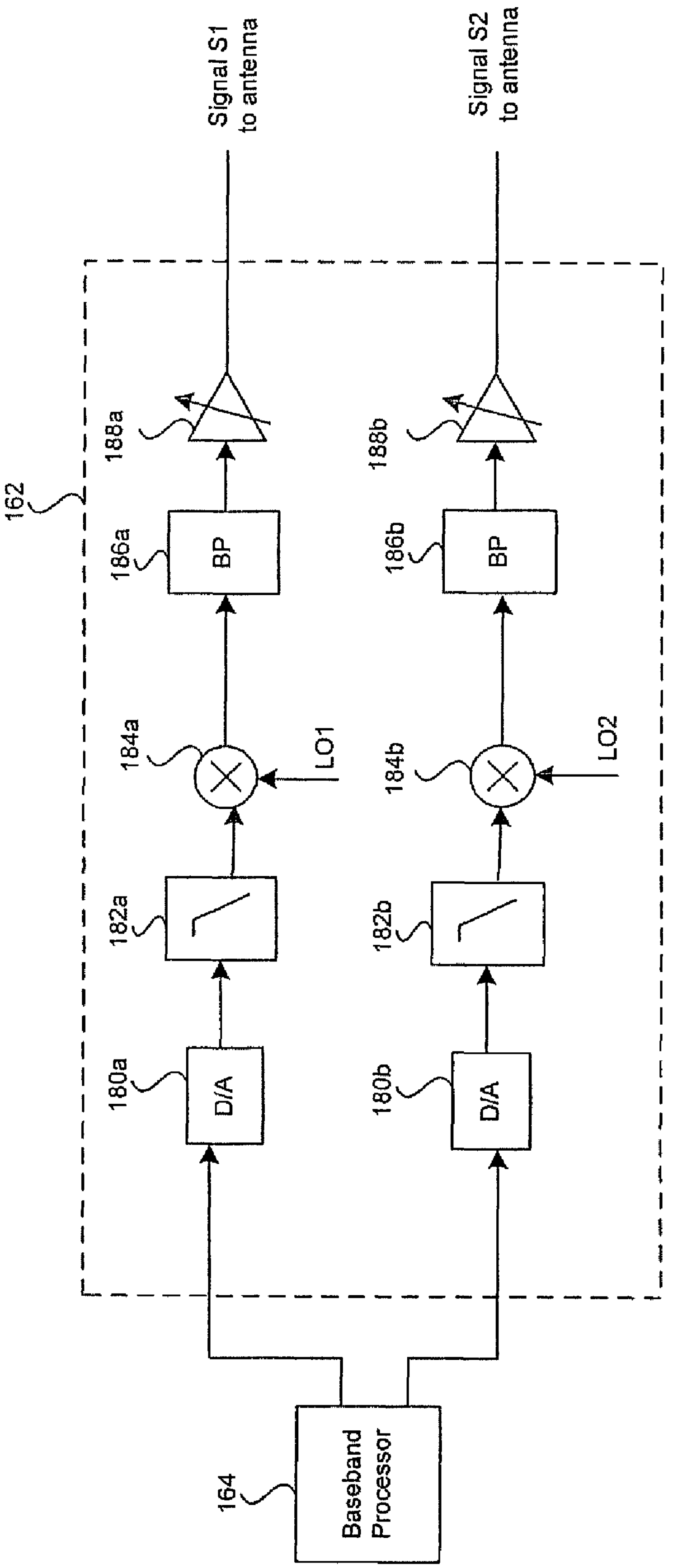
FIG. 1*f* is a block diagram illustrating exemplary transmit processing circuitry, in accordance with an embodiment of the invention.

FIG. 1*f* is a block diagram illustrating exemplary transmit processing circuitry, in accordance with an embodiment of the invention. Referring to FIG. 1*f*, there is shown a baseband processor 164 and an antenna front end 162. The antenna front end 162 may comprise two separate paths where each path may comprise a digital-to-analog converter 180, a low pass filter 182, an amplifier 172 and 178, a mixer 184, a bandpass filter 186, and an amplifier 188.

Digital baseband signals may be communicated from the baseband processor 164 to the digital-to-analog converters 180. The digital-to-analog converters 180 may convert the digital baseband signals to analog baseband signals. The analog baseband signals may be communicated to the low pass filters 182. The filtered signals from the low pass filters 182 may be communicated to the mixers 184. Each of the mixers 184 may mix the filtered signals with one of the local oscillator signals LO1 and LO2. Mixing the local oscillator signals LO1 and LO2 with the filtered signals may upconvert the analog baseband signals to RF frequencies. Accordingly, if the RF signals are to be transmitted in a same RF frequency range, the frequencies of the local oscillator signals LO1 and LO2 may be the same frequency. Output signals of the mixers 184 may be bandpass filtered and amplified by the bandpass filters 186 and the amplifiers 188, respectively. The RF signals may be communicated to the patch antenna 202 to be transmitted. Accordingly, the patch antenna 202 may transmit the signals polarized orthogonally with respect to each other. This may be polarization diversity transmission.

The invention need not be limited to the exemplary transmit paths described with respect to FIG. 1*f*. For example, rather than two digital signals from the baseband processor 164, there may be, for example, one digital signal from the baseband processor 164. The single digital signal may be converted to an analog signal and low-pass filtered by the digital-to-analog converter 180 and the low-pass filter 182, respectively. The filtered signal may then be communicated to the mixer 184. Output signal of the mixer 184 may be bandpass filtered and amplified by the bandpass filter 186 and the amplifier 188, respectively. The amplified output signals may be communicated to the patch antenna 202 to be transmitted. This may be polarization diversity transmission.

In some embodiments of the invention, polarization diversity transmission may not be desired. For example, a receiving base station may not have a capability to receive polarization diversity signals. Accordingly, signals may be communicated to the patch antenna 202 via only one of the striplines 204 or 206. For example, the stripline 204 may be used for vertical polarization, or the stripline 206 may be used for horizontal polarization.

Figure 2A:
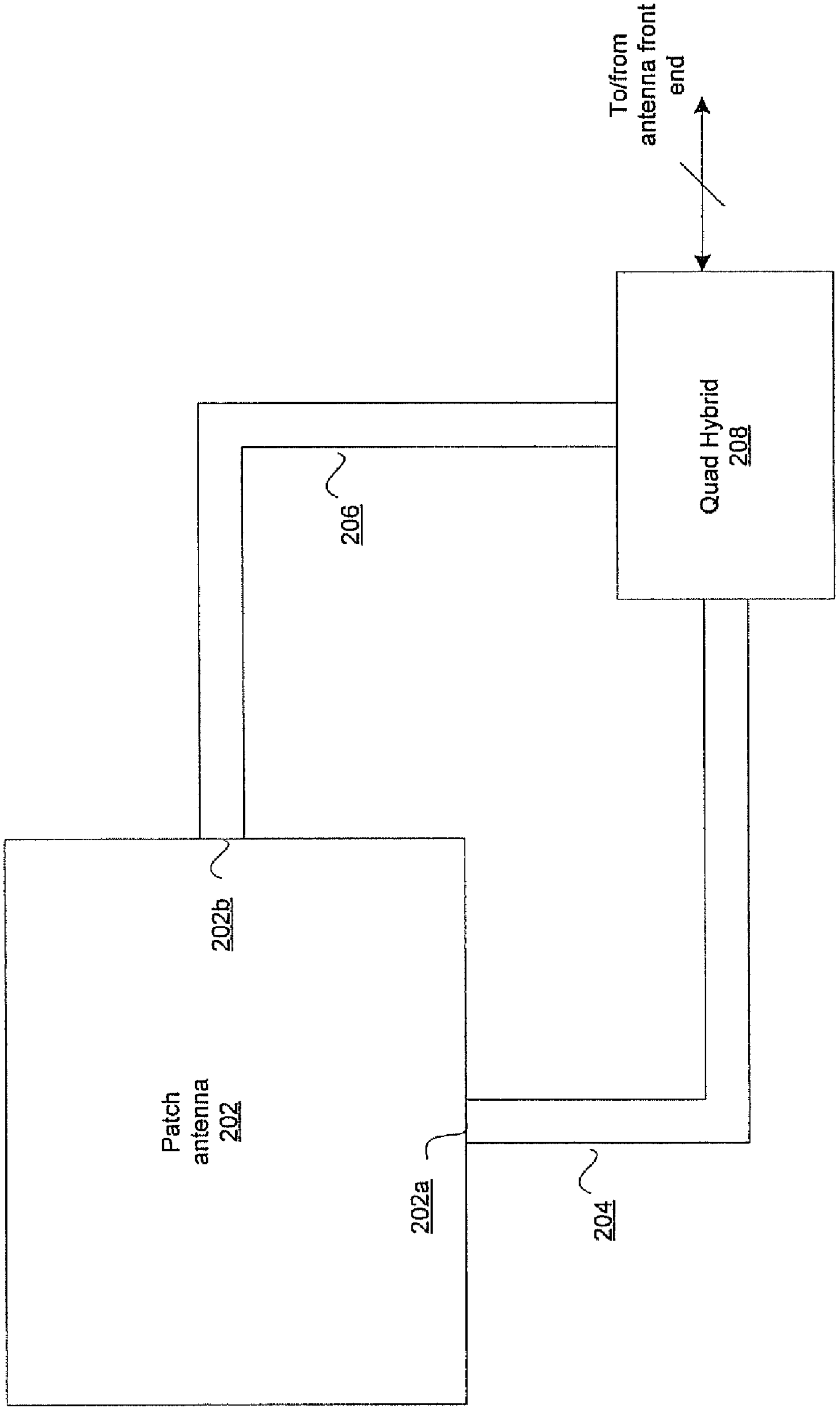
FIG. 2*a* is a diagram of an exemplary antenna for a mobile terminal, in accordance with an embodiment of the invention.

FIG. 2*a* is a diagram of an exemplary antenna for a mobile terminal, in accordance with an embodiment of the invention. Referring to FIG. 2*a*, there is shown a patch antenna 202, striplines 204 and 206, and a quad hybrid module 208. The patch antenna 202 may comprise conductive material that may be adapted to function as an antenna. The patch antenna 202 may function as multiple antennas, as described below. The conductive material may be, for example, similar to the conductive material used for striplines in a printed circuit (PC) board to conduct signals from one location to another. The RF signals may comprise signals whose frequency ranges may include, for example, UHF and/or VHF frequencies, and the cellular and/or PCS frequency ranges. Other frequencies that may be used by a mobile terminal, for example, the mobile terminal 160, may also be referred to as RF signals.

The dimensions of the patch antenna 202 may depend on the frequencies used by the mobile terminal 160 for communication. For example, the mobile terminal 160 may be able to communicate with the WLAN 106, and the wireless service provider network 104 that may use wideband code division multiple access (WCDMA) and high-speed downlink packet access (HSDPA). If a center frequency of approximately 2 GHz is chosen, the patch antenna 202 may have nominal dimensions of approximately 3 inches by 3 inches. This may be approximately the half-wavelength of a frequency in the frequency ranges utilized by the WLAN, WCDMA, and HSDPA. For example, the WLAN may be centered about 2.4 GHz, the WCDMA may be centered about 1.9 GHz, and HSDPA may be centered about 2.1 GHz. Generally, an antenna may have a length that is on the order of a half-wavelength or a quarter-wavelength of the signal that is to be received, although other lengths may also be used.

Various embodiments of the invention need not be limited to a patch antenna 3 inches square. For example, in one embodiment of the invention, a length in one dimension may be different than length in the other dimension. This may allow the patch antenna to correspond to two different frequency bands. As antenna geometry may affect performance of the patch antenna 202, the invention need not be limited by the shape of the patch antenna 202. Accordingly, other shapes, including circular shapes, may be used for the patch antenna 202.

The dimensions of the patch antenna 202 may depend on configuration of the ground structure, antenna geometry, geometry of the striplines leading out of the patch antenna 202, and/or the material that may comprise the conductive patch antenna and/or the substrate. The effects of the ground structure, etc, is described in more detail in "High Isolation Dual-Polarized Patch Antenna Using Integrated Defected Ground Structure," by Younkyu Chung, Seong-Sik Jeon, Dal Ahn, Jae-Ick Choi, and Tatsuo Itoh, IEEE Microwave and Wireless Components Letters, VOL. 14, No. 1, Jan. 2004, the relevant portions of which are hereby incorporated herein by reference. Signal accesses to and from the patch antenna is described in more detail in "A New Feeding Method For a Dual-Polarized Patch Antenna With Low Cross-Polarization Ratio," by Yoshiuki Fujino, Masato Tanaka, and Masaharu Fujita, International Symposium on Antennas (JINA), November 2002, Nice, France. Dual polarized antennas is described in more detail in "Basics of Dual-Polarized Antennas" which is published by the IEC and can be found at the URL "http://www.iec.org/online/tutorials/dual_polar/" and on related links.

The striplines 204 and 206 may be conductive paths that may be adapted to conduct RF signals between the patch antenna 202 and the quad hybrid module 208. Each stripline may be attached to a portion of the patch antenna 202, and that portion may be referred to as a port of the patch antenna 202. For example, the striplines 204 and 206 may be attached to the patch antenna 202 via the ports 202*a* and 202*b*, respectively. The quad hybrid module 208 may comprise circuitry that may be adapted to provide impedance matching for the RF signals between the striplines 204 and 206 and, for example, the circuitry in the antenna front end 162.

The patch antenna 202 may receive RF signals and the striplines 204 and 206 may conduct signals generated by the received RF signals. Each stripline 204 or 206 may conduct signals generated by both the electric field and the magnetic field of the received RF signals. The strength of the signals in each stripline 204 or 206 due to the electric field and the magnetic field may depend on the orientation of the mobile terminal 160 and/or polarization of the received signals.

The polarization of the signals transmitted by, for example, the base station 150 may change due to reflection and/or scattering of the transmitted signals from buildings and/or objects. Additionally, the base station 150 may transmit signals with polarization diversity. Accordingly, the patch antenna 202 may also receive the signals transmitted using polarization diversity, and the striplines 204 and 206 may conduct the received signals to the antenna front end 162. The received signals may be processed by the antenna front end 162 for each signal and/or further processed by the baseband processor 164. The RF signals may be transmitted by, for example, the mobile terminal 160 to the base station 150. The RF signals may be communicated from the antenna front end 162 to the quad hybrid 208 and then to the patch antenna 202.

When receiving polarization diversity transmitted signals, orthogonality of the received polarized signals may be desired. For example, a stream of data A may be transmitted at frequency X using horizontal polarization, and a different stream of data B may be transmitted at the same frequency X using vertical polarization. A dual polarized antenna may be used to receive the data streams A and B. The patch antenna 202 may be a dual polarized antenna since received signals polarized in a first direction may be communicated to the antenna front end 162 via the stripline 206, and received signals polarized orthogonally to the first direction may be communicated to the antenna front end 162 via the stripline 204.

If the receiving antenna, for example, the patch antenna 202, receives the streams of data A and B and the streams are still polarized orthogonally, the data from the streams A and B may be recovered. However, if the transmission path of the data streams A and B affects the polarization of the data streams A and B, the data streams A and B may interfere with each other. Cross polar discrimination may be used to measure this effect. Cross polar discrimination may refer to a signal that starts with one polarization, but is received with the other polarization. This may be measured in dBs. Accordingly, cross polar discrimination may be measured for the patch antenna 202 to determine orthogonality of the patch antenna 202 with respect to polarization diversity signals.

Figure 2B:
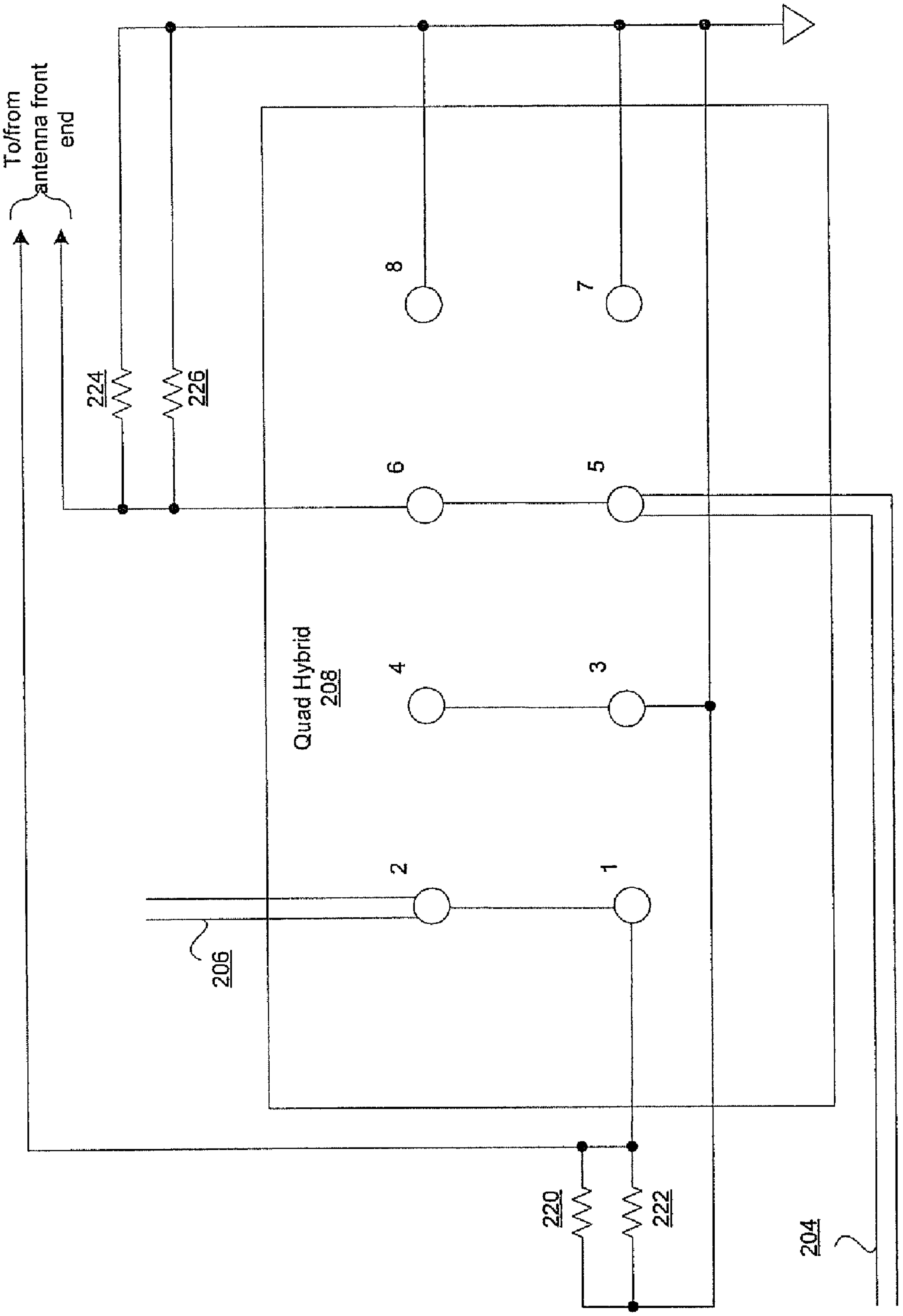
FIG. 2*b* is a block diagram of an exemplary quad hybrid shown in FIG. 2*a*, in accordance with an embodiment of the invention.

FIG. 2*b* is a block diagram of an exemplary quad hybrid shown in FIG. 2*a*, in accordance with an embodiment of the invention. Referring to FIG. 2*a*, there is shown a quad hybrid 208. The quad hybrid 208 may comprise eight pins labeled 1, 2, 3, 4, 5, 6, 7, and 8. There is also shown four resistors 220, 222, 224, and 226.

The stripline 204 may be connected to pin 5, and pin 5 may be coupled to pin 6. Pin 6 may be coupled to first terminals of the resistors 224 and 226. The second terminals of the resistors 224 and 226 may be connected to ground. The resistors 224 and 226 may be, for example, 100 ohm resistors. The two resistors in parallel may have an effective impedance of 50 ohms. The parallel resistors 224 and 226 may be termination for the stripline that may also have a 50 ohm impedance. The 50 ohm impedance of the termination and the stripline may match the impedance of a connection from the resistors 224 and 226 to the antenna front end 162. The connection may be, for example, a coaxial cable with an impedance of 50 ohms. The matching impedances may minimize signal loss.

Similarly, the stripline 206 may be connected to pin 2, and pin 2 may be coupled to pin 1. Pin 1 may be coupled to first terminals of the resistors 220 and 222. The second terminals of the resistors 220 and 222 may be connected to ground. The two resistors in parallel may have an effective impedance of 50 ohms. The parallel resistors 220 and 222 may be termination for the stripline that may also have an impedance of 50 ohms. The impedance of the termination and the stripline may match the impedance of a connection from the resistors 220 and 222 to the antenna front end 162. The connection may be, for example, via a coaxial cable with an impedance of 50 ohms. The matching impedances may minimize signal loss.

Pins 3, 4, 7, and 8 may be connected to ground. Accordingly, the RF signals at the pins 1 and 2 may be buffered from the RF signals at the pins 5 and 6 by the ground connection at pins 3 and 4. This may reduce crosstalk from the signals at the pins 1 and 2 to the signals at the pins 5 and 6, and vice versa.

Figure 3:
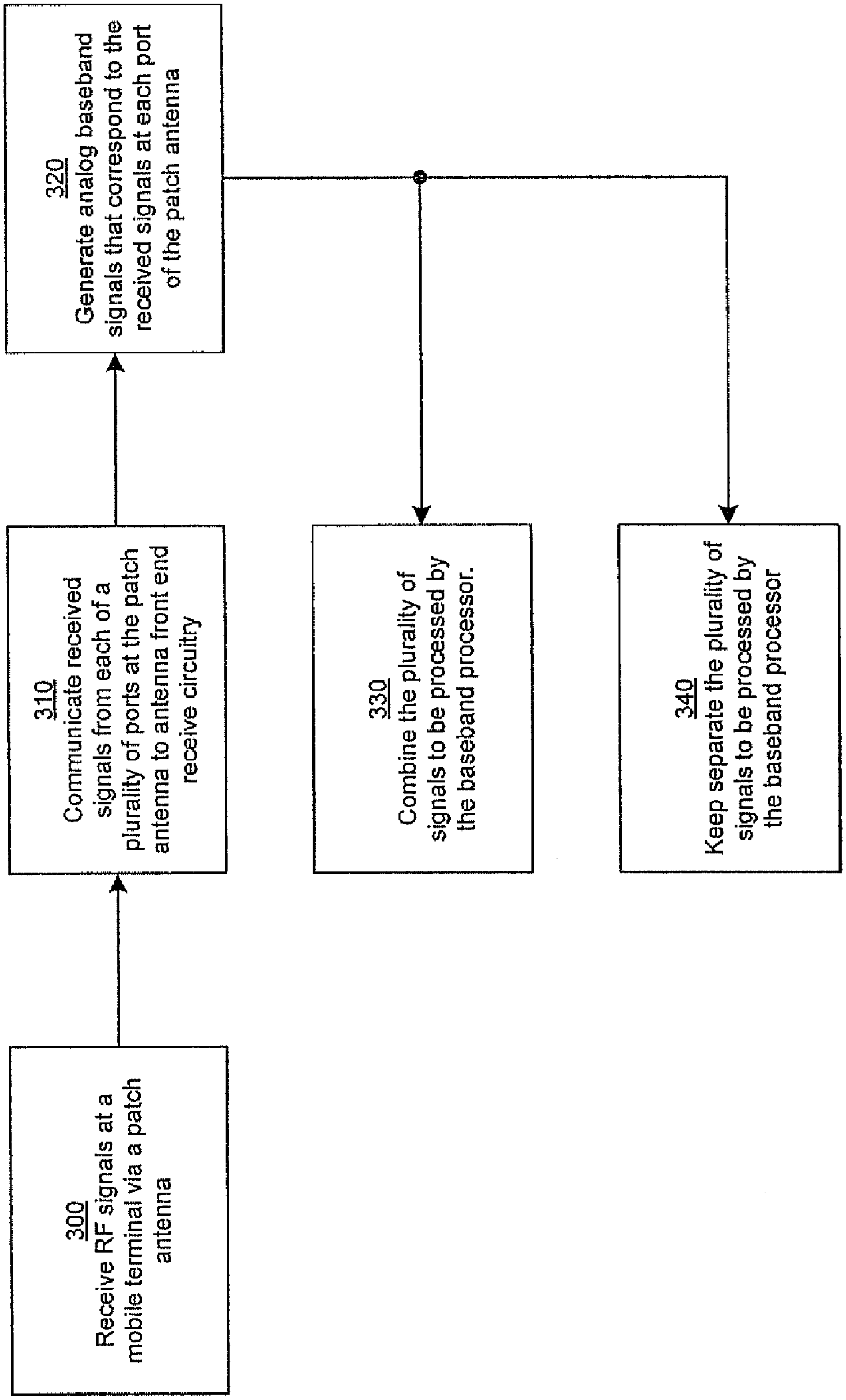
FIG. 3 is a flow chart illustrating exemplary steps for receiving signals with a patch antenna, in accordance with an embodiment of the invention.

FIG. 3 is a flow chart illustrating exemplary steps for receiving signals with a patch antenna, in accordance with an embodiment of the invention. In step 300, the mobile terminal 160 may receive RF signals via the patch antenna 202. In step 310, received RF signals may be communicated from each port 202*a* and 202*b* of the patch antenna 202 to the antenna front end 162. In step 320, the antenna front end 162 may generate a plurality of analog baseband signals that correspond to the received RF signals communicated from each port 202*a* and 202*b* of the patch antenna 202. In step 330, the plurality of analog baseband signals may be combined for processing by the baseband processor 164. In step 340, the plurality of baseband signals may be processed separately and communicated separately to the baseband processor 164.

Referring to FIG. 3, in step 300, the patch antenna 202 in the mobile terminal 160 may receive RF signals transmitted by, for example, the base station 150. In step 310, the received RF signals may be communicated to the quad hybrid 208 via the striplines 204 and 206. The received RF signals may then be communicated to the antenna front end 162 from the quad hybrid 208. In step 320, the antenna front end 162 may process the received RF signals. The RF signals may be, for example, filtered, amplified, and down-converted to analog baseband signals by the bandpass filters 170, the amplifiers 172, and the mixers 174, respectively. The next step may be step 330 or step 340. The particular step may depend on whether the signals received may be from the same network or from different networks.

In step 330, the analog baseband signals may be combined together. The combined analog baseband signal may be, for example, low-pass filtered and then converted to digital baseband signals by the low-pass filter 176 and the analog-to-digital converter 178, respectively. The digital baseband signals may be communicated to the baseband processor. Combining the signals communicated by the striplines 204 and 206 may be desirable if the mobile terminal 160 is only communicating with one network, for example, the wireless service provider network 104. The signals on the two striplines 204 and 206 may be signals that may have been transmitted using polarization diversity and may be the same data. This may be done for areas where there may be, for example, variations in attenuations of transmitted signals with respect to specific polarization. For example, during a period of time, there may be attenuation in vertically polarized signals while the horizontally polarized signals may not be attenuated as much. Similarly, for another period of time, there may be attenuation of the horizontally polarized signals while the vertically polarized signals may not be attenuated as much. Accordingly, the combined signal may have a better signal-to-noise ratio over a period of time than either the vertically polarized signal or the horizontally polarized signal.

In step 340, the analog baseband signals may be kept separate. Accordingly, there may be two digital baseband signals that may be communicated from the antenna front end 162 to the baseband processor 164. Each analog baseband signal may be, for example, low-pass filtered and then converted to digital baseband signal by the low-pass filter 176 and the analog-to-digital converter 178, respectively. Each digital baseband signal may correspond to the received RF signals communicated by each stripline 204 and 206. The received RF signals may have been, for example, transmitted at different frequencies. The transmissions may have been, for example, from different communication networks such as the wireless service provider network 104 and the terrestrial broadcasting network 102. To enhance reception of the different frequency ranges of the different networks, a horizontal dimension, for example, of the patch antenna 202 may be different than a vertical dimension of the patch antenna 202.

Alternatively, two different streams of data may have been transmitted from the same base station. Accordingly, the two streams of data may have been transmitted at the same RF frequency using polarization diversity. The two different streams of data may not be combined as analog signals since doing so may corrupt independent data in one stream with data from the other stream. In this regard, the two streams of data may be processed separately by the antenna front end 162 and the baseband processor 164. For example, one stream of data may be odd bits of the data and the other stream may be even bits of the data. Accordingly, if the two streams of digital data are to be combined, the baseband processor 164 may combine the digital data.

Figure 4:
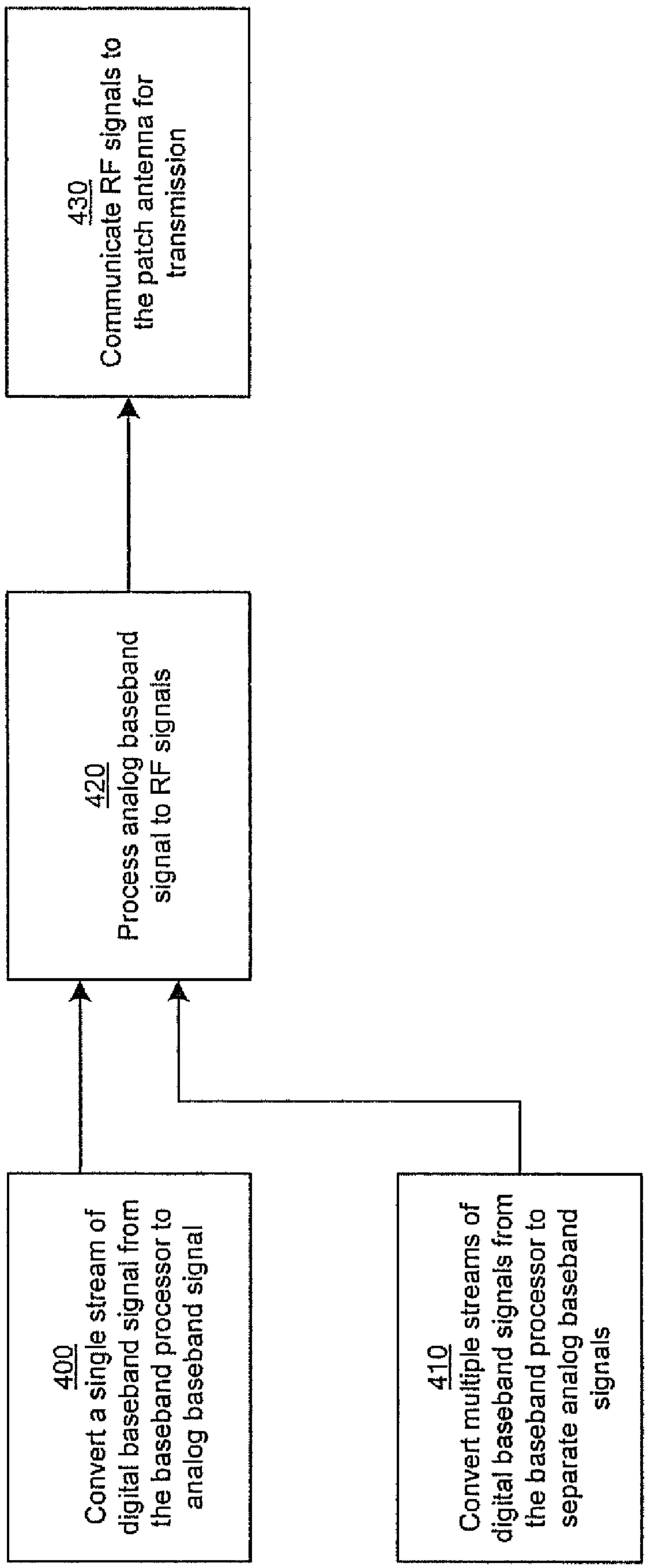
FIG. 4 is a flow chart illustrating exemplary steps for transmitting signals with a patch antenna, in accordance with an embodiment of the invention.

FIG. 4 is a flow chart illustrating exemplary steps for transmitting signals with a patch antenna, in accordance with an embodiment of the invention. In step 400, a single stream of digital baseband signal from the baseband processor 164 may be converted to analog baseband signal. In step 410, a plurality of digital baseband signals from the baseband processor 164 may be converted to a plurality of analog baseband signals. In step 420, the analog baseband signals may be processed to RF signals. In step 430, the RF signals may be communicated to the patch antenna 202 to be transmitted.

Referring to FIG. 4, in step 400, the baseband processor 164 may communicate, for example, a stream of digital data to the antenna front end 162. The stream of digital data may be converted to analog baseband signal by the digital-to-analog converter 180. In step 410, the baseband processor 164 may communicate, for example, two streams of digital data to the antenna front end 162. The streams of digital data may be converted to analog baseband signals by the digital-to-analog converters 180.

In step 420, the single analog baseband signal from the digital-to-analog converter 180, or the two analog baseband signals from the digital-to-analog converters 180, may be low-pass filtered and then mixed to RF frequencies by the low-pass filter and the mixers 182 and 184, respectively. The RF frequency signals may then be bandpass filtered and amplified by the bandpass filter 186 and amplifier 188, respectively.

In step 430, the RF signals may be communicated to the quad hybrid 208. The RF signals may be communicated from the quad hybrid 208 to the patch antenna 202 via the striplines 204 and 206. The patch antenna 202 may transmit the communicated signals. For example, the signals communicated to the patch antenna 202 by the stripline 204 may be vertically polarized. Similarly, the signals communicated to the patch antenna 202 by the stripline 206 may be horizontally polarized. The RF signals transmitted may be independent streams of data transmitted at different frequencies for different applications, or at the same frequency for the same application.

In accordance with an embodiment of the invention, aspects of an exemplary system may comprise signal processing circuitry, which may comprise the antenna front end 162 within a mobile terminal 100. The signal processing circuitry may process RF signals received by a patch antenna 202, where the RF signals may comprise at least one of a plurality of polarizations. The patch antenna 202 may be a dual-polarized antenna and may comprise a plurality of ports 202*a* and 202*b*. The RF signals at the port 202*a* may be orthogonally polarized with respect to the RF signals at the port 202*b*. Each orthogonally polarized signal may be polarized in a single direction when transmitted.

There may be circuitry, for example, the baseband processor 164, that may enable measurement of cross-polar discrimination of the RF signals communicated via, for example, the port 202*a* and the RF signals communicated via, for example, the port 202*b*. The measurement of the cross-polar discrimination may be used to determine orthogonality of the dual-polarized antenna, which may be, for example, the patch antenna 202.

The patch antenna 202 may be optimized to receive and/or transmit frequencies at different RF bands. This may be accomplished, for example, when the patch antenna 202 has dimensions that may be optimized to receive or transmit specific frequencies. This may be design and/or implementation dependent for use of the mobile terminal 100 with specific applications. The applications may be, for example, wireless communication using cellular frequencies, wireless communication using PCS frequencies, and receiving digital television broadcast signals. Each band of frequencies received may be communicated to, for example, its respective antenna front end 162 and the band processor 164 via separate ports for processing.

The signal processing circuitry, for example, the antenna front end 162 may combine a plurality of signals to one signal. The plurality of signals may be processed from the RF signals communicated via the plurality of ports 202*a* and 202*b*. The baseband processor 164 may independently process each of a plurality of signals communicated via the ports 202*a* and 202*b*.

The RF signals may be communicated from the patch antenna 202 to the quad hybrid 208 via the striplines 204 and 206. The quad hybrid 208 may buffer the RF signals communicated via the stripline 204 from the RF signals communicated via the stripline 206. The buffering may comprise a ground strip that may isolate one set of RF signals from another set of RF signals. The quad hybrid 208 may also provide termination for RF signals. Accordingly, termination impedance at the quad hybrid 208 may match impedance of, for example, a cable that may be used to communicate the RF signals to and from the antenna front end 162. The matching impedance may reduce attenuation of the communicated RF signal.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communication system, the method comprising:
performing by one or more processors and/or circuits in a mobile terminal:
receiving signals for a plurality of frequencies at a patch antenna using polarization diversity; and
determining whether to combine or independently process said received signals based on one or both of: whether said received signals are received from a single communication network and/or a polarization of said received signals.

2. The method according to claim 1, wherein at least a horizontal dimension for said patch antenna and a vertical dimension for said patch antenna is specified based on said plurality of frequencies.

3. The method according to claim 2, wherein a width measurement for said horizontal dimension is different from a length measurement for said vertical dimension.

4. The method according to claim 2, comprising selectively receiving a portion of said plurality of frequencies via said horizontal dimension.

5. The method according to claim 2, comprising receiving said each of said plurality of frequencies that correspond to a vertical polarization mode via said vertical dimension.

6. The method according to claim 2, comprising outputting said received signals corresponding to said vertical polarization mode from said patch antenna via a vertical port.

7. The method according to claim 2, comprising receiving said each of said plurality of frequencies that correspond to a horizontal polarization mode via said horizontal dimension.

8. The method according to claim 7, comprising outputting said received signals corresponding to said horizontal polarization mode from said patch antenna via a horizontal port.

9. The method according to claim 8, comprising measuring cross polar discrimination based on said received signals that are output via said horizontal port and said received signals that are output via a vertical port from said patch antenna.

10. The method according to claim 8, comprising selectively combining said received signals that are output via said horizontal port and said received signals that are output via a vertical port from said patch antenna.

11. A system for communicating information in a communication system, the system comprising:
one or more circuits in a mobile terminal, said one or more circuits being operable to:
receive signals for a plurality of frequencies at a patch antenna using polarization diversity; and
determine whether to combine or independently process said received signals based on one or both of: whether said received signals are received from a single communication network and/or a polarization of said received signals.

12. The system according to claim 11, wherein at least a horizontal dimension for said patch antenna and a vertical dimension for said patch antenna is specified based on said plurality of frequencies.

13. The system according to claim 12, wherein a width measurement for said horizontal dimension is different from a length measurement for said vertical dimension.

14. The system according to claim 12, wherein said one or more circuits are operable to selectively receive a portion of said plurality of frequencies via said horizontal dimension.

15. The system according to claim 12, wherein said one or more circuits are operable to receive said each of said plurality of frequencies that correspond to a vertical polarization mode via said vertical dimension.

16. The system according to claim 12, wherein said one or more circuits are operable to output said received signals corresponding to said vertical polarization mode from said patch antenna via a vertical port.

17. The system according to claim 12, wherein said one or more circuits are operable to receive said each of said plurality of frequencies that correspond to a horizontal polarization mode via said horizontal dimension.

18. The system according to claim 17, wherein said one or more circuits are operable to output said received signals corresponding to said horizontal polarization mode from said patch antenna via a horizontal port.

19. The system according to claim 18, wherein said one or more circuits are operable to measure cross polar discrimination based on said received signals that are output via said horizontal port and said received signals that are output via a vertical port from said patch antenna.

20. The system according to claim 18, wherein said one or more circuits are operable to selectively combine said received signals that are output via said horizontal port and said received signals that are output via a vertical port from said patch antenna.

* * * * *